US00RE37837E

(19) United States
(12) Reissued Patent
Shoulders et al.

(10) Patent Number: US RE37,837 E
(45) Date of Reissued Patent: Sep. 10, 2002

(54) REVERSE ROTATION PREVENTION FOR SCROLL COMPRESSORS

(75) Inventors: Stephen L. Shoulders, Baldwinsville, NY (US); Thomas R. Barito, Arkadelphia, AR (US)

(73) Assignee: Carrier Corporation, Syracuse, NY (US)

(21) Appl. No.: 09/204,331

(22) Filed: Dec. 2, 1998

Related U.S. Patent Documents

Reissue of:
(64) Patent No.: 5,496,157
Issued: Mar. 5, 1996
Appl. No.: 08/360,482
Filed: Dec. 21, 1994

(51) Int. Cl.[7] ..... F04C 18/04
(52) U.S. Cl. ..... 418/14; 418/55.5; 418/57
(58) Field of Search ..... 418/14, 55.5, 57

(56) References Cited

U.S. PATENT DOCUMENTS

| | | | | | |
|---|---|---|---|---|---|
| 1,780,109 | A | * | 10/1930 | Berglund | 418/57 |
| 3,884,599 | A | | 5/1975 | Young et al. | 418/55.5 |
| 3,924,977 | A | | 12/1975 | McCullough | 418/55.5 |
| 4,045,682 | A | * | 8/1977 | Poorbaugh et al. | 307/127 |
| 4,696,630 | A | * | 9/1987 | Sakata et al. | 418/55.5 |
| 4,764,096 | A | * | 8/1988 | Sawai et al. | 418/55.5 |
| 4,820,130 | A | * | 4/1989 | Eber et al. | 417/32 |
| 4,877,382 | A | | 10/1989 | Caillat et al. | 418/55.5 |
| 4,886,435 | A | * | 12/1989 | Sawai et al. | 418/55.6 |
| 4,969,801 | A | * | 11/1990 | Haseley et al. | 417/18 |
| 4,990,057 | A | * | 2/1991 | Rollins | 417/12 |
| 4,998,864 | A | * | 3/1991 | Muir | 417/410 |
| 5,017,107 | A | * | 5/1991 | Fraser, Jr. et al. | 418/55.5 |
| 5,290,161 | A | * | 3/1994 | Swain | 418/55.1 |
| 5,320,507 | A | * | 6/1994 | Monnier et al. | 418/55.6 |
| 5,433,589 | A | | 7/1995 | Wada et al. | 418/55.5 |
| 5,520,524 | A | | 5/1996 | Takemoto et al. | 418/14 |
| 5,545,019 | A | | 8/1996 | Beck et al. | 418/55.1 |

FOREIGN PATENT DOCUMENTS

| | | | | |
|---|---|---|---|---|
| DE | 3317871 | * | 11/1984 | |
| EP | 0078148 | * | 10/1982 | |
| EP | 0468605 | * | 1/1992 | 418/55.5 |
| JP | 55-60684 | * | 5/1980 | 418/57 |
| JP | 61-272481 | * | 12/1986 | |
| JP | 4-50489 | * | 2/1992 | 418/55.5 |
| JP | 5187366 | * | 7/1993 | 418/55.5 |
| JP | 5248371 | * | 9/1993 | 418/55.5 |
| JP | 5248372 | * | 9/1993 | 418/55.5 |
| JP | 6-185476 | * | 7/1994 | |
| JP | 6-185477 | * | 7/1994 | |

* cited by examiner

*Primary Examiner*—John J. Vrablik
(74) *Attorney, Agent, or Firm*—Banner & Witcoff, Ltd.

(57) ABSTRACT

In a scroll compressor, under conditions favoring reverse operation, the scroll wraps are separated so as to provide a continuous, unimpeded path through the scrolls. Spring bias, a repositioning of driving contact areas and/or force areas can be used singly or in combination to cause separation of the wraps.

7 Claims, 5 Drawing Sheets

REVERSE ROTATION PREVENTION FOR SCROLL COMPRESSORS

Matter enclosed in heavy brackets [ ] appears in the original patent but forms no part of this reissue specification; matter printed in italics indicates the additions made by reissue.

*RELATED APPLICATIONS*

*This application is related to Reissue Application No. 09/151,514, filed Sep. 10, 1998, now abandoned.*

BACKGROUND OF THE INVENTION

Rotary compressors generally are capable of reverse operation wherein they act as expanders. Reverse operation can occur at shutdown when the closed system seeks to equalize pressure via the compressor thereby causing the compressor to run as an expander with negligible load. This problem has been addressed by providing a discharge check valve, as exemplified by commonly assigned U.S. Pat. Nos. 4,904,165 and 5,088,905, located as close to possible to the scroll discharge to minimize the amount of high pressure gas available to power reverse operation. As long as any high pressure gas is available to power reverse operation, some movement of the orbiting scroll will take place with attendant noise even if there is no attendant danger to the scroll compressor. Even if not harmful, the noise can be annoying and its reduction and/or elimination is desirable. This was addressed in commonly assigned U.S. Pat. No. 5,167,491 where the compressor is unloaded prior to shutdown. The real problem is due to the lack of a load in reverse operation at shutdown. Without a load in reverse operation, the compressor components may be damaged due to excessive speed/stress.

SUMMARY OF THE INVENTION

Under conditions that normally result in reverse flow through the compressor such as very low speed operation, a power interruption or shutdown, a continuous, unimpeded flow path is established through the wraps. The unimpeded flow path permits pressure equalization through the compressor while preventing high speed reverse operation of the pump unit. Also, the present invention prevents powered reverse operation of single phase compressors where power is restored during reverse operation.

It is an object of this invention to prevent powered reverse operation in a scroll compressor.

It is another object of this invention to prevent the noise associated with reverse rotation of the scrolls of a scroll compressor.

It is a further object of this invention to lower the starting torque as a result of reduced scroll eccentricity at startup. These objects, and others as will become apparent hereinafter, are accomplished by the present invention.

Basically, under conditions subject to producing reverse operation, the scroll wraps are separated so as to provide a continuous, unimpeded path through the scrolls.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENT

Figure 1:
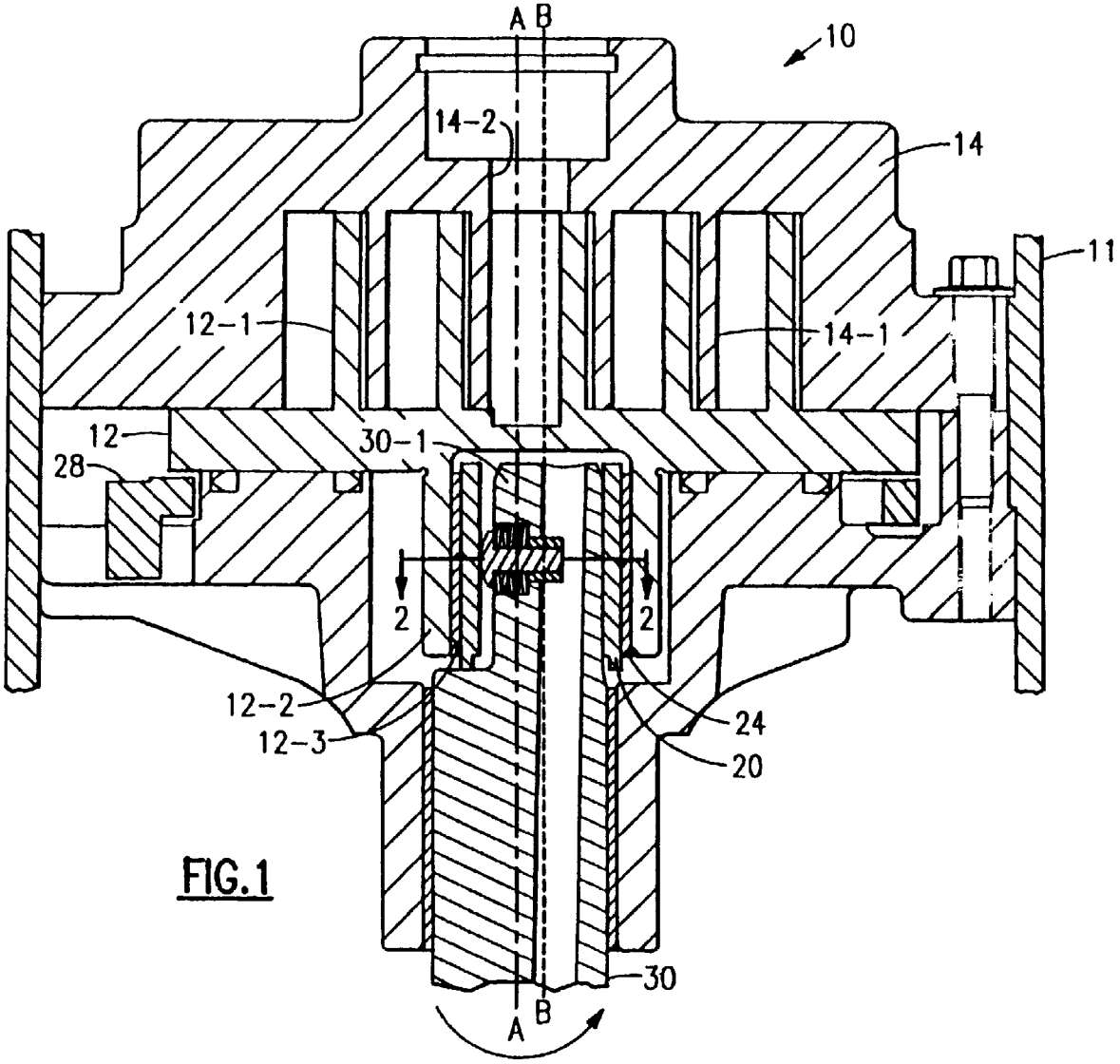
FIG. 1 is a vertical sectional view of a portion of a scroll compressor employing the present invention in the unpowered or reverse flow operation.

In FIG. 1 the numeral 10 generally indicates a low side hermetic scroll compressor which is only partially illustrated. Scroll compressor 10 includes an orbiting scroll 12 with a wrap 12-1 and a fixed scroll 14 with a wrap 14-1. Orbiting scroll 12 has a hub 12-2 with a bore 12-3 which receives slider block 20. The line A—A represents the axis of crankshaft 30 while B—B represents the axis of bore 12-3 as well as the center of the wrap of the orbiting scroll 12 whose axis orbits about the center line of fixed scroll 14.

Figure 2:
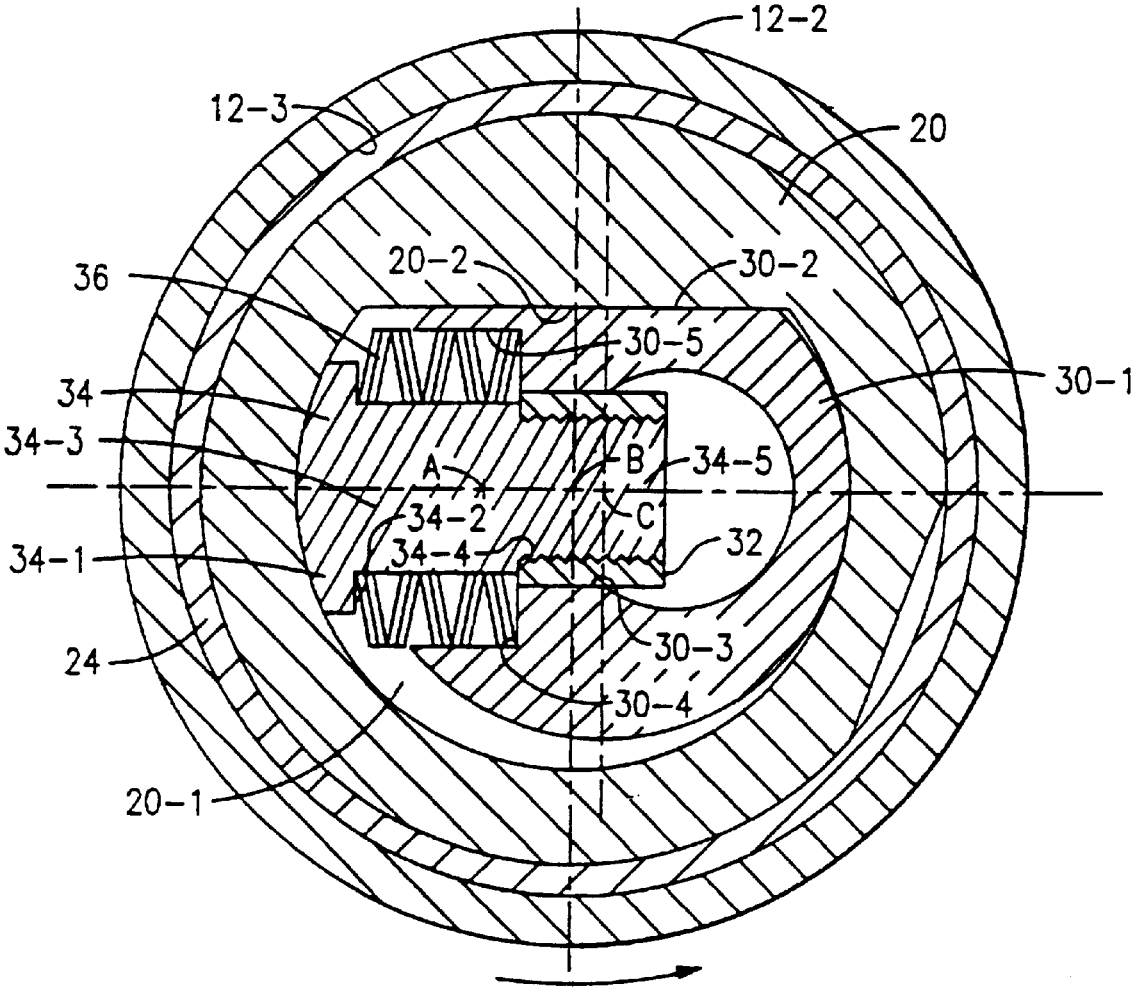
FIG. 2 is a sectional view of the slider block mechanism taken along line 2—2 of FIG. 1.

As best shown in FIG. 2, drive pin portion 30-1 of crankshaft 30 has an axis C—C represented by point C and is received in elongated or "D-shaped" recess 20-1 of slider block 20 such that barreled drive area 30-2 of drive pin 30-1 can engage flat 20-2 of slider block 20. Flat 20-2 is essentially parallel to a plane containing axes A—A, B—B and C—C when drive pin 30-1 is in the driving position. Slider block 20 rotates within bearing 24 and moves as a unit with crankshaft 30 and has relative movement with respect to hub 12-2 of orbiting scroll 12 which is held to an orbiting movement by Oldham coupling 28. The reciprocating of slider block 20, as a unit with bearing 24 and hub 12-2, is the only significant relative motion between slider block 20 and drive pin 30-1 of crankshaft 30 that can occur during operation. This movement is generally on the order of 0.001 inches during steady state operation. A larger movement can occur during startup, shut down or whatever liquid trapped between the scrolls drives the orbiting scroll 12 part from fixed scroll 14.

As illustrated in FIG. 1, wraps 12-1 and 14-1 can be radially separated such that an unimpeded, continuous reverse flow path exists between discharge port 14-2 and the interior of shell or casing 11 which is at suction pressure. The position of the slider block 20 relative to drive pin 30-1, as illustrated in FIGS. 1 and 2, represents the position of the elements when compressor 10 is unpowered or is under the conditions of reverse flow and is achieved due to the biasing effect of a stack of Belleville washers 36. Drive pin 30-1 has a transverse bore 30-3 which is separated from counter bore 30-5 by annular shoulder 30-4. Tubular insert 32 is internally threaded and slidably received in bore 30-3. Guide pin 34 has a rounded head 34-1 complementary to the curvature of recess 20-1, a first cylindrical portion 34-3 separated from head 34-1 by shoulder 34-2 and a second reduced diameter cylindrical portion 34-5 having a threaded exterior and separated from first cylindrical portion 34-3 by shoulder 34-4. Belleville washer stack 36 is located on first cylindrical portion 34-3 then tubular insert 32 is threaded onto reduced diameter cylindrical portion 34-5 until insert 32 engages shoulder 34-4. The assembly made up of pin 34, Belleville washer stack 36 and tubular insert 32 is placed in drive pin 30-1 such that tubular inset 32 is in bore 30-3 and Belleville washer stack 36 and cylindrical portion 34-3 are at least partially located in counterbore 30-5 as illustrated in FIG. 2. When assembled as illustrated in FIGS. 1 and 2, the Belleville washer stack 36 will seat on shoulders 34-2 and 30-4 thereby tending to [separate axis A—A and B—B] *cause axis B—B to move towards axis A—A* by moving hub 12-2 and thereby orbiting scroll 12. If the free length of stack 36 is sufficient, guide pin 34 and drive pin 30-1 will be in contact with the walls of recess 20-1 at diametrically opposed locations defined by the plane containing axes A—A, B—B, and C—C as well as along flat 20-2.

Starting with the members in the position shown in FIGS. 1 and 2 and presuming that compressor 10 is off and that the refrigeration system in which it is located has been allowed to equalize in pressure, starting compressor 10 will be relatively easy since wraps 12-2 and 14-1 are not in contact and therefore cannot trap volumes to be compressed. Additionally, since the orbiting scroll 12 is starting from a smaller orbit radius, any frictional torque resistance is minimized as a result of the reduced torque movement. With the crankshaft 30 rotating in a counterclockwise direction as indicated by the arrows in FIGS. 1 and 2, centrifugal force will be produced which will cause axis B—B, and thereby orbiting scroll 12, to move away from axis A—A about which it is rotating. A scroll 12 is move by centrifugal force it overcomes the bias of spring stack 36 thereby moving head 34-1 of pin 34 towards counterbore 30-5 and moving tubular insert 32 further into bore 30-3. Movement of pin 34 is limited by the contacting of wraps 12-1 and 14-1 or by the spring stack 36 either due to its increased bias or due to its collapse to its minimum height. As long as sufficient centrifugal force is being produced the operation of compressor 10 will satisfactory. If the rotating speed of crankshaft 30 is insufficient to produce sufficient centrifugal force due to operation at too low of a speed or due to lack of power to compressor 10, the bias force of the spring stack 36 will cause axis B—B, and thereby orbiting scroll 12, to move towards axis A—A thereby separating wraps 12-1 and 14-1 to create a continuous unrestricted flow path through the compressor, allowing pressure to equalize between suction and discharge. While this is occurring, torque, due to forces acting on orbiting scroll 12 that tends to cause reverse operation, is reduced because the moment arm is reduced. After equalization, torque is zero. Wraps 12-1 and 14-1 will stay separated until the speed of the compressor is increased sufficiently or the compressor is restarted and brought up to sufficient speed.

To achieve a great degree of torque reduction, it is advantageous to allow the orbiting scroll 12 to move radially inward as much as possible within limitations imposed by design. This can be accomplished by a combination of sizing the "D-shaped" recess 20-1 in slider block 20 and of sizing of the outer diameter of drive pin 30-1 and the positioning of drive pin 30-1 relative to crankshaft center [C—C] *A—A*. These modifications must be consistent with other design constraints. Of course, travel must not be great enough that orbit radius is too little to allow energizing the orbiting scroll 12 at startup.

Figure 3:
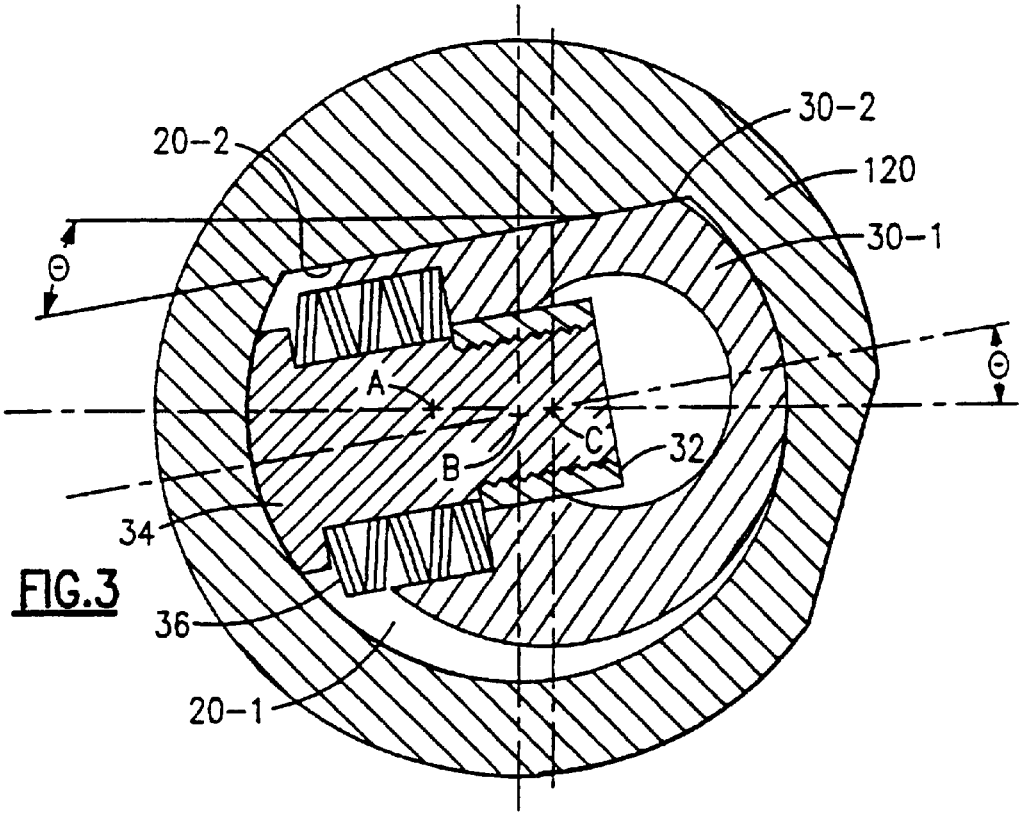
FIG. 3 is sectional view corresponding to FIG. 2 showing a first modified embodiment of the present invention.

The slider block/eccentric drive-type mechanism can be configured so that the inertia load causing wraps 12-1 and 14-1 to contact is opposed by both the radial gas load and another load, applied at eccentric barreled drive area 30-2, equal to $F_{tg}$ tan θ, where $F_{tg}$ is the tangential gas load and the angle θ is a design feature. Preferably, θ is of a value such that at a speed for which is desirable for wraps to separate, the friction load, that tends to prevent the wraps from separating, is counteracted. This design feature, the angle θ, is illustrated in FIG. 3, which differs from FIG. 2 in that recess 20-1 in slider block 120 is reoriented such that flat 20-2 is at an angle θ with the plane defined by axes A—A and [B—B] *C—C*. As a result, the plane containing axes A—A and C—C is at an angle θ with the plane containing axes B—B and C—C. The structure of FIG. 3 is otherwise the same as that of FIG. 2 but the operation is different. When the motor (not illustrated) is deenergized an additional separation force to that of spring 36 will come into play. So the wraps 12-1 and 14-1 will separate approximately when $$mR_o\omega^2 < F_{tg} \tan\theta + F_{rg} - F_{tg}\mu + \text{the spring bias force}$$

where m is the combined mass of orbiting scroll 12 and slider block 20

$R_o$ is the orbit radius in the fully energized position

ω is the rotational speed of the compressor/crankshaft at the onset of wrap separation $F_{tg}$ is the tangential gas force $F_{rg}$ is the radial gas force μ is the coefficient of friction between 20-2 and 30-2

Thus, in effect, the device of FIG. 3 adds an additional wrap separating mechanism to the FIG. 2 configuration.

Figure 4:
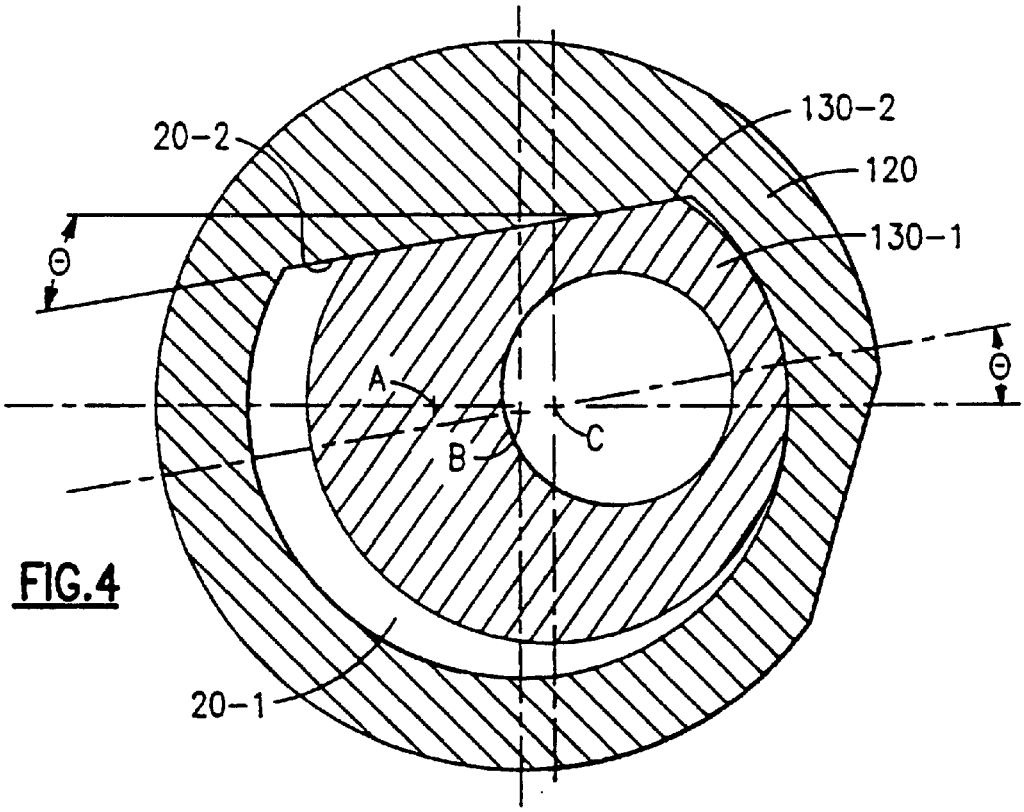
FIG. 4 is a sectional view corresponding to FIG. 2 showing a second modified embodiment of the present invention.

The device of FIG. 4 is the same as that of FIG. 3 except that the spring biasing structure has been eliminated. Accordingly, separation of wraps 12-1 and 14-1 will occur approximately when $$mR_o\omega^2 < F_{tg} \tan\theta + F_{rg} - F_{tg}\mu.$$

The orientation of the barreled drive area 130-2 of drive pin 130-1, as defined by the angle θ, can have a substantially effect on compressor efficiency because it can affect whether the flanks of wraps 12-1 and 14-1 contact each other and seal effectively. AS discussed above, the same effect can be used to advantage during shutdown or power interruptions since separating the wraps 12-1 and 14-1, and keeping them separated, can prevent reverse rotation of orbiting scroll 12. However, flat orientations that are best for normal operation and for keeping the wraps 12-1 and 14-1 separated during shutdown are not necessarily the same, so a compromise between these two goals may be required.

Figure 5:
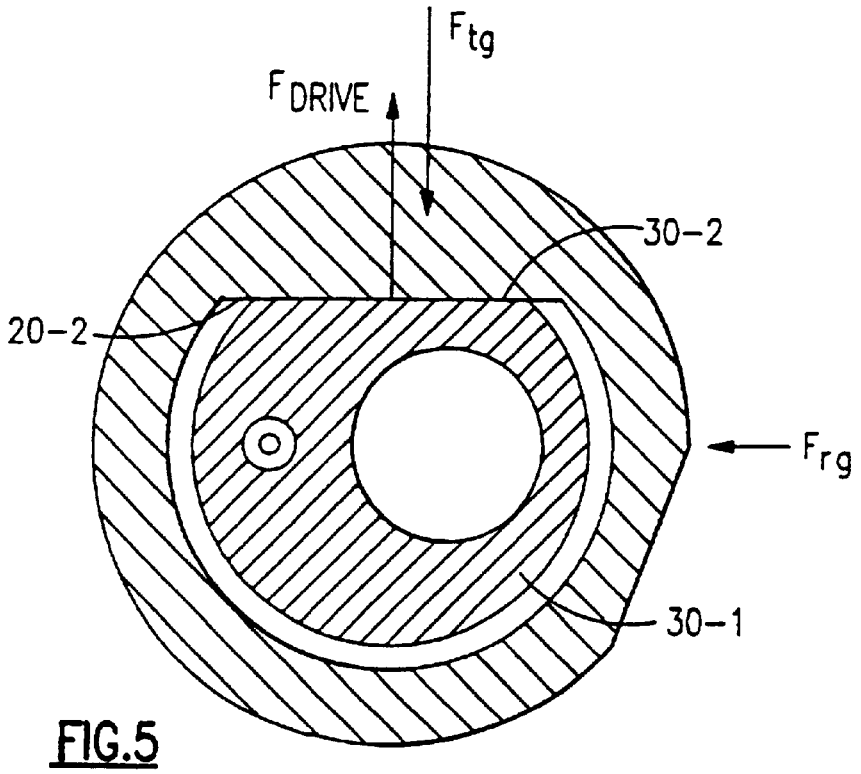
FIG.5 Prior Art
FIG. 5 illustrates the conventional drive flat orientation and the forces acting thereon.

FIG. 5 illustrates the conventional drive flat orientation of FIG. 2 without the spring. As shown in FIG. 5, the drive force acting on the slider block, $F_{drive}$, is normal to driving surface 30-2 and driven surface 20-2. However, as shown, $F_{drive}$ has one vector component, $F'_{drive}$, opposite and equal to $F_{tg}$ and a second component, $F''_{drive}$, acting with the radial gas force, $F_{rg}$, in tending to separate the wraps 12-1 and 14-1.

Figure 7:
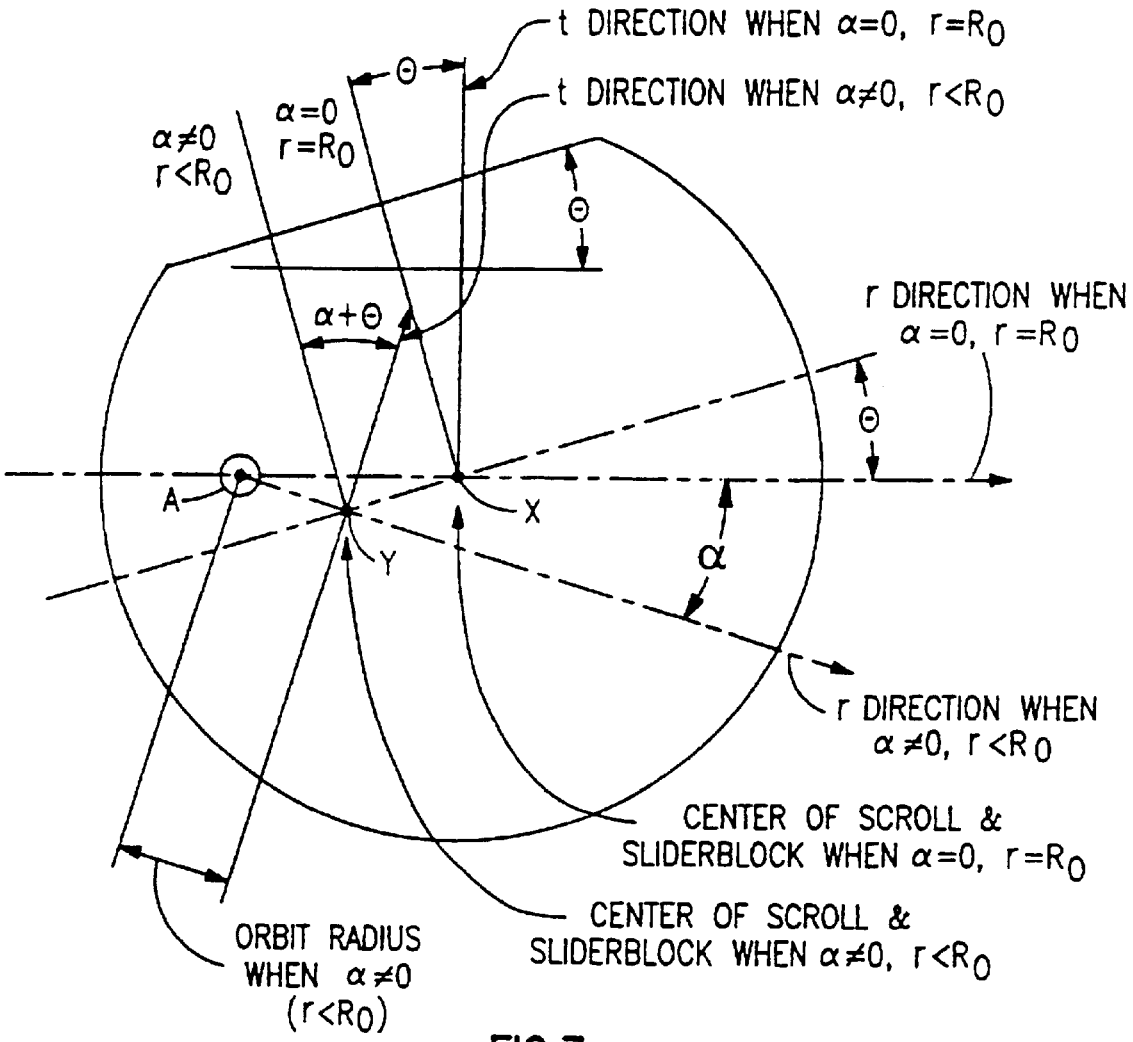
Figure 8:
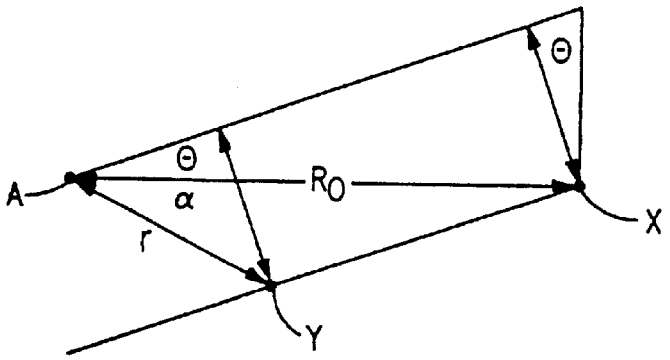

Referring to FIG. 7, point A is the center of shaft rotation, point X is the center of the slider block 20 during normal operation (fully energized position), and point Y is the center of the slider block 20 when slider block is moved by sliding along flat 20-2, so scroll wrap flank separation has occurred and a gas path from discharge to suction exists. The angle θ represents the orientation of flat 20-2 relative to a line parallel to a line passing through points A and X. It is therefore a fixed design feature. The angle α is the angle between a line passing through points A and X and a line passing through points A and Y. The angle between the lines of action of tangential gas force, $F_{tg}$, and the drive force, $F_{drive}$, is denoted by α+θ. Referring to FIG. 8, the relationship between α+θ and the amount the slider block 20 has moved can be derived using trigonometry:

$$\alpha+\theta = \sin^{-1}[(R_o/r)\sin\theta]$$

where $R_o$=orbit radius in fully energized position (with slider block center at X) $R_o$=distance from X to A and r=orbit radius when flank separation of some degree exists (slider block center at Y) (r=distance from Y to A)

Study of this equation shows that the angle $\alpha+\theta$ between drive force, $F_{drive}$, and tangential gas force, $F_{tg}$, varies as the slider block moves along the flat and, correspondingly, as scroll wrap separation is occurring.

Figure 6:
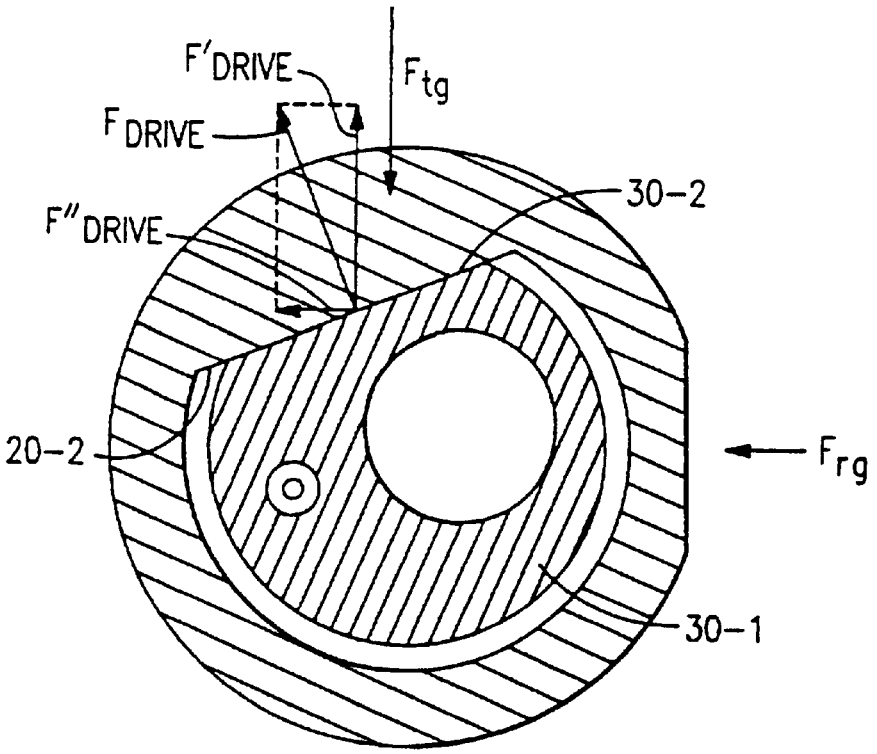
FIGS. 6–8 are force diagrams of the embodiment of FIG. 4.

Specifically, for cases where $\theta$ is greater than zero, (positive $\theta$ is defined in FIG. 7) $\alpha+\theta$ increases as orbit radius r decreases; that is, as flank separation increases. As a consequence, the component of normal reaction, $F''_{drive}$, defined in FIG. 6, that acts to separate wraps increases as the amount of wrap separation increases (where the sign convention shown in FIG. 7 is such that a positive value enhances operation, a negative value opposes it).

This behavior only occurs for designs with $\theta$>zero. As review of the equation above shows, when $\theta$=zero, $\alpha+\theta$ is equal to zero regardless of how much the slider block 20 moves during flank separation. Thus, conventional designs with $\theta$=zero, as illustrated in FIG. 5, do not exhibit the behavior described above.

The significance of this behavior is that designs for which $\theta$>zero realize a twofold benefit. First, a component of force tending to cause wrap separation is created. (This was explained previously). Second, a positive separation effect is achieved, since once separation begins the separating force increases in magnitude as separation progresses. Both of these benefits are useful for the purposes of this invention.

The above explanation applied to FIG. 4 would apply to FIG. 3 by adding the spring bias.

Although preferred embodiments of the present invention have been illustrated and described, other changes will occur to those skilled in the art. It is therefore intended that the present invention is to be limited only by the scope of the appended claims.

What is claimed is:

[1. A scroll compressor means including a pair of scrolls one of which being an orbiting scroll, a slider block and a crankshaft wherein said orbiting scroll has a hub with a bore which has an axis and which receives said slider block, and said crankshaft has an axis of rotation and a drive pin which is received in a bore in said slider block, one of said pin and said slider block having a flat surface normally engaged by the other one of said pin and said slider block, said bore in said slider block being larger than said pin and generally coaxial with said bore in said hub and said drive pin acting through said slider block to drive said orbiting scroll during normal operation and said orbiting scroll tending to act through said slider block to drive said drive pin and crankshaft during reverse operation and pressure equalization through said compressor means at shutdown, reverse rotation prevention means comprising:

said orbiting scroll and said slider block being movable with respect to said drive pin along said flat surface between a first position in which said orbiting scroll engages the other one of said pair of scrolls during normal operation and a second position in which said orbiting scroll is separated from the other one of said pair of scrolls upon slowing down and any tendency for reverse operation and pressure equalization;

centrifugal force produced solely by movement of said orbiting scroll and said slider block during normal operation tends to keep said orbiting scroll and said slider block in said first position;

means for causing said orbiting scroll and said slider block to move along said flat surface from said first position to said second position under conditions associated with slowing down and reverse operation whereby said pair of scrolls is separated, an unimpeded flow path is established through said compressor means and reversing torque caused by gas loads is decreased by reduction of orbit radius.]

[2. The scroll compressor means of claim 1 wherein said means for causing said orbiting scroll and slider block to move from said first to said second position includes spring means.]

[3. The scroll compressor means of claim 2 wherein said spring means acts between said slider block and said drive pin in a manner that tends to radially separate said pair of scrolls.]

[4. The scroll compressor means of claim 2 wherein said means for causing said orbiting scroll and slider block to move from said first to said second position further includes a line of action between said drive pin and said slider block at an acute angle to a plane defined by said axis of rotation and said axis of said bore.]

[5. The scroll compressor means of claim 4 wherein said acute angle is between 5° and 30°.]

[6. The scroll compressor means of claim 1 wherein said means for causing said orbiting scroll and slider block to move from said first to said second position includes a line of action between said drive pin and said slider block at an acute angle to a plane defined by said axis of rotation and said axis of said bore.]

[7. The scroll compressor means of claim 6 wherein said acute angle is between 5° and 30°.]

[8. The scroll compressor means of claim 1 wherein said means for causing said orbiting scroll and slider block to move from said first to said second position includes a first line of action between said drive pin and said slider block in said first position and a second line of action between said drive pin and said slider block in said second position.]

[9. The scroll compressor means of claim 1 wherein said means for causing said orbiting scroll and slider block to move from said first to said second position includes a continuously varying line of action between said drive pin and said slider block between said first and second positions as said pair of scrolls radially separate.]

*10. A scroll compressor means including a pair of scrolls one of which being an orbiting scroll, a slider block and a crankshaft wherein said orbiting scroll has a hub with a bore which has an axis and which receives said slider block, and said crankshaft has an axis of rotation and a drive pin which is received in a bore in said slider block, one of said pin and said slider block having a flat surface normally engaged by the other one of said pin and said slider block, said bore in said slider block being larger than said pin and generally coaxial with said bore in said hub and said drive pin acting through said slider block to drive said orbiting scroll during normal operation and said orbiting scroll tending to act through said slider block to drive said drive pin and crankshaft during reverse operation and pressure equalization through said compressor means at shutdown, reverse rotation prevention means comprising:*

*said orbiting scroll and said slider block being movable with respect to said drive pin along said flat surface between a first position in which said orbiting scroll engages the other one of said pair of scrolls during normal operation and a second position in which said orbiting scroll is separated from the other one of said pair of scrolls upon slowing down and any tendency for reverse operation and pressure equalization;*

*centrifugal force produced solely by movement of said orbiting scroll and said slider block during normal*

*operation tends to keep said orbiting scroll and said slider block in said first position;*

*means for causing said orbiting scroll and said slider block to move along said flat surface from said first position to said second position and to separate said pair of scrolls during slowing down of said compressor before any reverse rotation occurs, establishing an unimpeded flow path through said compressor means and decreasing reversing torque caused by gas loads by reduction of orbit radius;*

*wherein said means for causing said orbiting scroll and slider block to move from said first to said second position includes spring means and further including said flat surface being oriented at an acute angle to a plane defined by said axis of rotation and an axis of rotation of said drive pin.*

*11. A scroll compressor means including a pair of scrolls one of which being an orbiting scroll, a slider block and a crankshaft wherein said orbiting scroll has a hub with a bore which has an axis and which receives said slider block, and said crankshaft has an axis of rotation and a drive pin which is received in a bore in said slider block, one of said pin and said slider block having flat surface normally engaged by the other one of said pin and said slider block, said bore in said slider block being larger than said pin and generally coaxial with said bore in said hub and said drive pin acting through said slider block to drive said orbiting scroll during normal operation and said orbiting scroll tending to act through said slider block to drive said drive pin and crankshaft during reverse operation and pressure equalization through said compressor means at shutdown, reverse rotation prevention means comprising:*

*said orbiting scroll and said slider block being movable with respect to said drive pin along said flat surface between a first position in which said orbiting scroll engages the other one of said pair of scrolls during normal operation and a second position in which said orbiting scroll is separated from the other one of said pair of scrolls upon slowing down and any tendency for reverse operation and pressure equalization;*

*centrifugal force produced solely by movement of said orbiting scroll and said slider block during normal operation tends to keep said orbiting scroll and said slider block in said first position;*

*means for causing said orbiting scroll and said slider block to move along said flat surface from said first position to said second position and to separate said pair of scrolls during slowing down of said compressor before any reverse rotation occurs, establishing an unimpeded flow path through said compressor means and decreasing reversing torque caused by gas loads by reduction of orbit radius, said means for causing including said flat surface being oriented at an acute angle to a plane defined by said axis of rotation and an axis of rotation of said drive pin.*

*12. A scroll compressor means including a pair of scrolls one of which being an orbiting scroll, a slider block and a crankshaft wherein said orbiting scroll has a hub with a bore which has an axis and which receives said slider block, and said crankshaft has an axis of rotation and a drive pin which is received in a bore in said slider block, one of said pin and said slider block having a flat surface normally engaged by the other one of said pin and said slider block, said bore in said slider block being larger than said pin and generally coaxial with said bore in said hub and said drive pin acting through said slider block to drive said orbiting scroll during normal operation and said orbiting scroll tending to act through said slider block to drive said drive pin and crankshaft during reverse operation and pressure equalization through said compressor means at shutdown, reverse rotation prevention means comprising:*

*said orbiting scroll and said slider block being movable with respect to said drive pin along said flat surface between a first position in which said orbiting scroll engages the other one of said pair of scrolls during normal operation and a second position in which said orbiting scroll is separated from the other one of said pair of scrolls upon slowing down and any tendency for reverse operation and pressure equalization;*

*centrifugal force produced solely by movement of said orbiting scroll and said slider block during normal operation tends to keep said orbiting scroll and said slider block in said first position; and*

*means for causing said orbiting scroll and said slider block to move along said flat surface from said first position to said second position to separate said pair of scrolls during slowing down of said compressor before reverse rotation occurs, establishing an unimpeded flow path through said compressor means and decreasing reversing torque caused by gas loads by reduction of orbit radius.*

*13. A scroll compressor means including a pair of scrolls one of which being an orbiting scroll, a slider block and a crankshaft wherein said orbiting scroll has a hub with a bore which has an axis and which receives said slider block, and said crankshaft has an axis of rotation and a drive pin which is received in a bore in said slider block, one of said pin and said slider block having a flat surface normally engaged by the other one of said pin and said slider block, said bore in said slider block being larger than said pin and generally coaxial with said bore in said hub and said drive pin acting through said slider block to drive said orbiting scroll during normal operation and said orbiting scroll tending to act through said slider block to drive said drive pin and crankshaft during reverse operation and pressure equalization through said compressor means at shutdown, reverse rotation prevention means comprising:*

*said orbiting scroll and said slider block being movable with respect to said drive pin along said flat surface between a first position in which said orbiting scroll engages the other one of said pair of scrolls during normal operation and a second position in which said orbiting scroll is separated from the other one of said pair of scrolls upon slowing down and any tendency for reverse operation and pressure equalization;*

*centrifugal force produced solely by movement of said orbiting scroll and said slider block during normal operation tends to keep said orbiting scroll and said slider block in said first position; and*

*a spring member, said spring member biasing said orbiting scroll and said slider block along said flat surface from said first position to said second position to separate said pair of scrolls during slowing down of said compressor before reverse rotation occurs, establishing an unimpeded flow path through said compressor means and decreasing reversing torque caused by gas loads by reduction of orbit radius.*

*14. A scroll compressor means including a pair of scrolls one of which being an orbiting scroll, a slider block and a crankshaft wherein said orbiting scroll has a hub with a bore which as an axis and which receives said slider block, and said crankshaft has an axis of rotation and a drive pin which*

*is received in a bore in said slider block, one of said pin and said slider block having a flat surface normally engaged by the other one of said pin and said slider block, said bore in said slider block being larger than said pin and generally coaxial with said bore in said hub and said drive pin acting through said slider block to drive said orbiting scroll during normal operation and said orbiting scroll tending to act through said slider block to drive said drive pin and crankshaft during reverse operation and pressure equalization through said compressor means at shutdown, reverse rotation prevention means comprising:*

*said orbiting scroll and said slider block being movable with respect to said drive pin along said flat surface between a first position in which said orbiting scroll engages the other one of said pair of scrolls during normal operation and a second position in which said orbiting scroll is separated from the other one of said pair of scrolls upon slowing down and any tendency for reverse operation and pressure equalization;*

*centrifugal force produced solely by movement of said orbiting scroll and said slider block during normal operation tends to keep said orbiting scroll and said slider block in said first position;*

*wherein said flat surface is oriented at an acute angle to a plane defined by said axis of rotation and an axis of rotation of said drive pin, said angled flat surface biasing said orbiting scroll and said slider block along said flat surface from said first position to said second position to separate said pair of scrolls during slowing down of said compressor before reverse rotation occurs, establishing an unimpeded flow path through said compressor means and decreasing reversing torque caused by gas loads by reduction of orbit radius.*

*15. The scroll compressor means of claim 14, wherein the acute angle is between 5° and 30°.*

*16. The scroll compressor means of claim 11, wherein the acute angle is between 5° and 30°.*

* * * * *